(12) United States Patent
Roberts et al.

(10) Patent No.: US 8,315,528 B2
(45) Date of Patent: Nov. 20, 2012

(54) ZERO MEAN CARRIER RECOVERY

(75) Inventors: Kim B. Roberts, Nepean (CA); Ahmed Awadalla, Ottawa (CA)

(73) Assignee: Ciena Corporation, Hanover, MD (US)

( * ) Notice: Subject to any disclaimer, the term of this patent is extended or adjusted under 35 U.S.C. 154(b) by 399 days.

(21) Appl. No.: 12/644,409

(22) Filed: Dec. 22, 2009

(65) Prior Publication Data

US 2011/0150505 A1    Jun. 23, 2011

(51) Int. Cl.
*H04B 10/06*    (2006.01)
(52) U.S. Cl. .......................... 398/208; 398/202
(58) Field of Classification Search .......... 398/208, 398/202, 214, 209
See application file for complete search history.

(56) References Cited

U.S. PATENT DOCUMENTS

| | | | |
|---|---|---|---|
| 5,732,111 A * | 3/1998 | Walley | 375/344 |
| 6,973,150 B1 | 12/2005 | Thuringer | |
| 7,522,841 B2 | 4/2009 | Bontu et al. | |
| 7,555,227 B2 | 6/2009 | Bontu et al. | |
| 7,606,498 B1 * | 10/2009 | Wu et al. | 398/152 |
| 7,747,177 B2 | 6/2010 | Chen et al. | |
| 7,970,290 B2 * | 6/2011 | Tao et al. | 398/202 |
| 2010/0138722 A1 | 6/2010 | Harley et al. | |

FOREIGN PATENT DOCUMENTS

WO    2010138198    12/2010

OTHER PUBLICATIONS

European Search Report, issued Nov. 29, 2011 on applicant's corresponding application EP 11 17 0260.
Zhang, et al., "Cycle slip mitigation in POLMUX-QPSK modulation", Optical Fiber Communication Conference, 2011, Technical Digest OFC/NFOEC, IEEE, Mar. 6, 2011, pp. 1-3.

\* cited by examiner

*Primary Examiner* — M. R. Sedighian
(74) *Attorney, Agent, or Firm* — Kent Daniels; Blake, Cassels & Graydon LLP

(57) ABSTRACT

A method of data symbol recovery in a coherent receiver of an optical communications system. Two or more SYNC bursts, having a known symbol sequence and periodicity, are processed to derive an estimate of a frequency offset $\Delta f$ between a transmit laser and a Local Oscillator (LO) of the receiver. A phase rotation $\kappa(n)$ is computed based on the estimate of the frequency offset $\Delta f$, and applied to a plurality of data symbol estimates to generate corresponding rotated symbol estimates. The rotated symbol estimates are then filtered to generate corresponding decision values of each data symbol.

18 Claims, 9 Drawing Sheets

ZERO MEAN CARRIER RECOVERY

CROSS-REFERENCE TO RELATED APPLICATIONS

This application is the first application filed for the present invention.

MICROFICHE APPENDIX

Not Applicable.

TECHNICAL FIELD

The present invention relates generally to optical communication systems, and in particular to systems and methods for cycle slip detection and correction in a coherent receiver.

BACKGROUND

In optical communication systems that employ coherent optical receivers, the modulated optical signal received at the coherent receiver is mixed with a narrow-line-width local oscillator (LO) signal, and the combined signal is made incident on one or more photodetectors. The frequency spectrum of the electrical current appearing at the photodetector output(s) is substantially proportional to the convolution of the received optical signal and the local oscillator (LO), and contains a signal component lying at an intermediate frequency that contains data modulated onto the received signal. Consequently, this "data component" can be isolated and detected by electronically filtering and processing the photodetector output current.

The LO signal is typically produced using a semiconductor laser, which is typically designed to have a frequency that closely matches the frequency of the laser producing the carrier signal at the transmitter. However, as is known in the art, such semiconductor lasers exhibit a finite line width from non-zero phase noise. As a result, frequency transients as high as ±400 MHz at rates of up to 50 kHz are common. This frequency offset creates an unbounded linear ramp in the phase difference between the two lasers. In addition, many such lasers often exhibit a line width of the order of 1 MHz with a Lorentzian spectral shape. As a result, even if the transmitter and LO lasers were to operate at exactly the same average frequency, a phase error linewidth of about ±2 MHz can still exist. This Lorentzian spectrum creates a phase variance that grows linearly with time, and the initial phase difference is random, so over the lifetime of operation of the optical connection the phase error is unbounded.

As is known in the art, data is typically encoded in accordance with a selected encoding scheme (eg Binary Phase shift Keying (BPSK); Quadrature Phase Shift Keying (QPSK), 16-Quadrature Amplitude Modulation (16-QAM) etc.) to produce symbols having predetermined amplitude and phase. These symbols are then modulated onto an optical carrier for transmission through the optical communications system to a receiver. At the receiver, the received optical signal is processed to determine the most likely value of each transmitted symbol, so as to recover the original data.

As is known in the art, a frequency mismatch or offset $\Delta f$, and independent phase noise, between the transmitter and LO laser appears as a time-varying phase error between detected symbols and the correct (or ideal) phase of the corresponding transmitted symbols as determined by the applicable encoding scheme. This phase error is exacerbated by phase non-linearities of the optical communications system, and in particular, cross-phase modulation (XPM). This phase error is unbounded, in that it tends to follow a ramp plus a Brownian random-walk trajectory and can rise to effectively infinite multiples of $2\pi$.

As is known in the art, because the phase error is unbounded, it cannot be compensated by a bounded filtering function. However, an unbounded filtering function is susceptible to cycle slips, as will be described in greater detail below.

Applicant's U.S. Pat. No. 7,606,498 entitled Carrier Recovery in a Coherent Optical Receiver, which issued Oct. 20, 2009, teaches techniques for detecting symbols in the presence of a frequency mismatch between the received carrier (that is, the transmitter) and the LO laser. In the system of U.S. Pat. No. 7,606,498, SYNC bursts having a known symbol (or bit) sequence and periodicity are used to determine an initial phase error value $\Delta\phi_0$, which represents an average phase error of detected symbols of the SYNC burst and the known (or ideal) phase values of the corresponding symbols as determined by the applicable encoding scheme). Once the SYNC burst has been processed, the receiver switches to a data directed mode, during which the symbol phase error $\Delta\phi$ is updated after a small group of, for example four, data symbol estimates, and used for rotating the phase of the next successive group of data symbol estimates. The rotated data symbol estimates are assumed to lie in the correct decision region of the encoding scheme symbol phase space. Consequently, the most likely value of each transmitted symbols can be determined by analysing the phase of each rotated data symbol estimate.

The process described in U.S. Pat. No. 7,606,498 is unbounded, and thus can compensate unbounded symbol phase error $\Delta\phi$. However, this also means that when the phase error $\Delta\phi$ becomes large enough (e.g. $\pi/4$ for QPSK, or $\pi/2$ for BPSK) a "cycle-slip" can occur, in which a symbol estimate can be erroneously interpreted as lying in a decision region that is adjacent to the correct decision region. This can result in the erroneous interpretation of every symbol (and thus all data) following the cycle-slip.

Techniques are known in the art for mitigating the impact of cycle slips. For example, U.S. Pat. No. 7,606,498 describes "forward and reverse" decoding in combination with Forward Error Correction (FEC) to mitigate the effects of cycle slips. The sample phase is effectively reset during processing of each SYNC burst, which limits the effects of a cycle slip to a single data block. Forward and reverse decoding further reduces the number of data symbols that are exposed to a cycle slip within any given data block. However, even with this arrangement, a cycle slip can produce a large number of errored symbols within a data block, so that a relatively strong FEC is needed.

As is known in the art, a given FEC method is capable of correcting up to a maximum number of errored symbols (or bits) which any given block of symbols. This known maximum number of errored symbols can be referred to as a "FEC budget", which can be committed to correcting errors due to noise and cycle-slips. Naturally, the portion of the FEC budget assigned to cycle slips reduces the remaining FEC budget that is available for correcting errored symbols due to noise. As the symbol rate of optical communication systems increases, sensitivity to noise also increases, and so does the desirability of devoting a larger portion of the FEC budget to noise correction.

The ability of this FEC to correct independent symbol errors determines the relevant probability level to be used in determining a worst case or maximum symbol event, for example $10^{-3}$. Similarly, the ability of this FEC to correct cycle slips determines the relevant probability level to be used in determining a worst case or maximum transient event, for example $10^{-10}$.

Applicant's co-pending U.S. patent application Ser. No. 12/326,933, filed Dec. 3, 2008 teaches techniques for detecting and correcting cycle slips, which reduces the average number of errored bits (due to cycle slips) that need to be corrected by FEC. According to U.S. patent application Ser. No. 12/326,933, the optical signal is formatted with SYNC bursts having a predetermined periodicity, and a plurality of known symbols at predetermined locations between successive SYNC bursts. The format, content and periodicity of the SYNC bursts can be as described in U.S. Pat. No. 7,606,498 and Applicant's co-pending U.S. Patent Application Publication No. 2007/0092260. The format, content and repetition rate of the known symbols are preferably selected to achieve a desired balance between performance of cycle-slip detection and compensation on the one hand, and overhead on the other.

At a receiver, the detected signal is partitioned into data blocks, each of which encompasses at least data symbols and a set of check symbols corresponding to the known symbols within the optical signal. Each data block is processed to detect a cycle slip, for example following the methods described above in U.S. Patent Application Publication No. 2007/0092260. When a cycle slip is detected, the set of check symbols of the data block are examined to identify a first slipped check symbol, and a phase correction applied to data symbols of the data block lying between the identified first slipped check symbol and the end of the data block.

This process corrects errored data symbols (due to cycle slips) which follow the first slipped check symbol within the data block, and so these errored data symbols do not have to be corrected by other methods such as FEC. Any errored data symbols lying ahead of the first slipped check symbol will remain uncorrected, however, and therefore remain to be corrected by other methods. However, on average, the number of residual errored data symbols is one-half of the data symbols which lie between two successive check symbols, which will normally be very much less than the total number of data symbols between successive SYNC bursts.

The techniques of U.S. patent application Ser. No. 12/326, 933 significantly reduce the FEC budget that must be allocated to correcting errored data symbols due to cycle slips. However, this benefit is obtained at a cost of increased overhead, and increased signal processing to detect cycle slips, locate the first slipped check symbol, and then correct data symbols following the first slipped check symbol in the data block.

Differential decoding schemes are also known in the art, and can limit the effect of a cycle slip to two consecutive symbols. However, differential decoding schemes suffer a disadvantage in that any detection error (due to any cause) will normally result in two errored symbols. In practical communications systems, this can result in a proliferation of errored symbols which exceeds the correction capacity of the FEC. Correct recovery of data by differential decoding requires that the corresponding differential encoding has previously been done to the data, which increases the complexity and cost of the transmitter.

Techniques for carrier recovery that overcome limitations of the prior art remain highly desirable.

SUMMARY

There are disclosed methods and techniques for correcting the effect of cycle slips in an optical communications system. Accordingly, an aspect of the present invention provides a method of data symbol recovery in a coherent receiver of an optical communications system. Two or more SYNC bursts, having a known symbol sequence and periodicity, are processed to derive an estimate of a frequency offset $\Delta f$ between a transmit laser and a Local Oscillator (LO) of the receiver. A phase rotation $\kappa(n)$ is computed based on the estimate of the frequency offset $\Delta f$, and applied to a plurality of data symbol estimates to generate corresponding rotated symbol estimates. The rotated symbol estimates are then filtered to generate corresponding decision values of each data symbol.

BRIEF DESCRIPTION OF THE DRAWINGS

Representative embodiments of the invention will now be described by way of example only with reference to the accompanying drawings, in which.

It will be noted that throughout the appended drawings, like features are identified by like reference numerals.

DETAILED DESCRIPTION OF PREFERRED EMBODIMENTS

Figure 1:
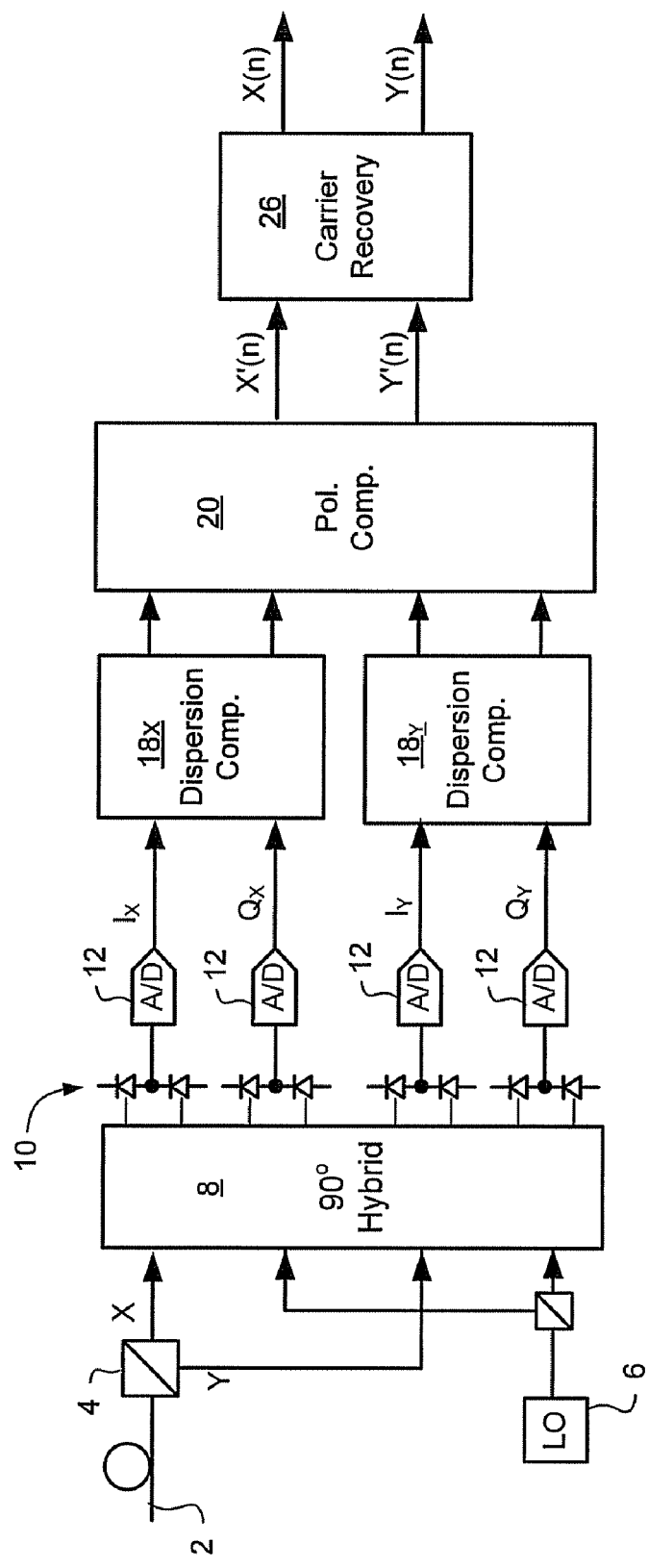
FIG. 1 is a block diagram schematically illustrating a coherent optical receiver, known from U.S. Pat. No. 7,606, 498 in which techniques in accordance with the present invention can be implemented.

The present invention exploits the observation that the phase error can be deconstructed into a relatively slow-changing unbounded component and a bounded component having a mean of zero relative to the evolving unbounded phase error. The unbounded phase error is primarily due to the frequency offset $\Delta f$, and independent laser line width, between the Tx and LO lasers, and changes relatively slowly (on the order of a few 10 s of MHz). The bounded phase error is dominated by Cross-phase modulation (XPM) and is rapidly changing (on the order of the symbol rate).

For the purposes of the present application, phase error is considered to be "bounded" if a maximum or peak, measured at the relevant probability level, of the phase error is substantially constant after an initial time, and is considered to be "unbounded" otherwise.

In very general terms, the present invention provides a system in which the received optical signal is processed to derive an estimate of the frequency error due to frequency offset Δf between the Tx and LO frequencies and independent laser line width. This frequency error estimate is then used to compute a phase rotation which is applied to a block of data symbol estimates. A bounded filter function is then used to process the rotated symbol estimates to determine the most likely value of each transmitted symbol.

For the purposes of the present application, a filter function is considered to be "bounded" if only those rotated symbol estimates which have a phase error lying within a predetermined phase range can be processed with a high probability of success.

In preferred embodiments, the frequency error is estimated using SYNC bursts have a known symbol sequence and periodicity. The format and periodicity of the SYNC bursts may conveniently be selected as described in U.S. Pat. No. 7,606,498. Because the symbol sequence and periodicity of each SYNC burst is known in advance, detection the SYNC bursts is impervious to cycle slips. Consequently, an estimate of the of the frequency error can be obtained from the respective phase errors of a series of successive SYNC bursts. Alternatively, the frequency error can be estimated by integrating symbol phase errors over time, for example as described in U.S. Pat. No. 7,606,498.

In the example embodiments described below, locally linear estimates of the unbounded phase evolution are computed, with an initial phase $\phi_0$ and a constant local slope $\psi$. Higher order methods such as cubic splines could be used, where the frequency error is not constant, at the cost of increased circuit complexity.

Applying a phase rotation that compensates the estimated frequency error to data symbol estimates yields corresponding rotated symbol estimates in which the residual phase error is bounded and has a mean value of zero. As a result, a bounded filter function can be used to compensate the residual sample phase error and determine the most likely value of each transmitted symbol. An advantage of this approach is that differential encoding schemes are not needed to obtain satisfactory data recovery performance in the receiver.

FIG. 1 schematically illustrates a representative coherent optical receiver in which techniques in accordance with the present invention can be implemented.

In the coherent optical receiver of FIG. 1, an inbound optical signal is received through an optical link 2, split into orthogonal polarizations by a Polarization Beam Splitter 4, and then mixed with a Local Oscillator (LO) signal 6 by a conventional 90° hybrid 8. The composite optical signals emerging from the optical hybrid 8 are supplied to respective photodetectors 10, which generate corresponding analog signals. The analog photodetector signals are sampled by respective Analog-to-Digital (A/D) converters 12 to yield multi-bit digital sample streams corresponding to In-phase (I) and Quadrature (Q) components of each of the received polarizations.

Figure 2A:
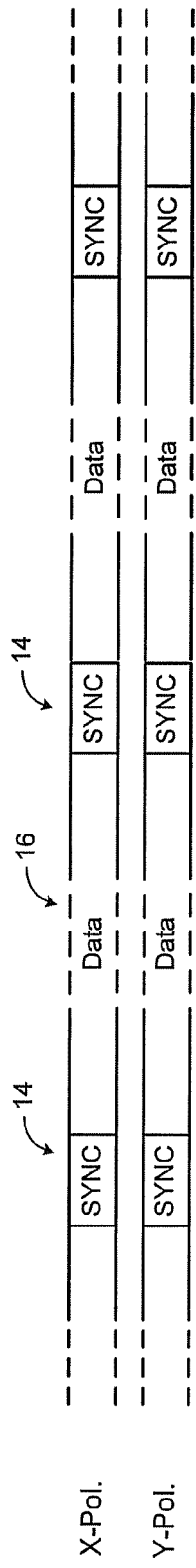
FIGS. 2a and 2b schematically illustrate respective alternative signal formats known from U.S. Pat. No. 7,606,498, which are usable in techniques in accordance with the present invention.
Figure 2B:
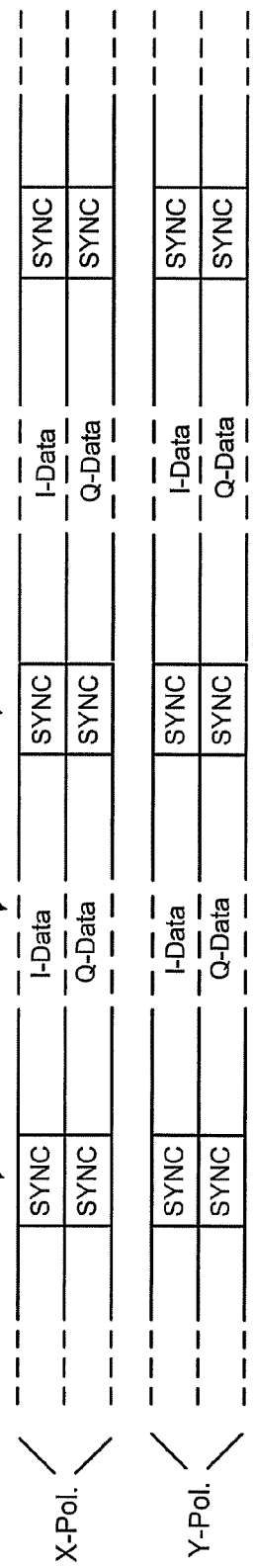

FIGS. 2a and 2b illustrate representative optical signal formats which may be used in conjunction with embodiments of the present invention. In each of the illustrated embodiments, the optical signal includes nominally regularly spaced SYNC bursts 14 embedded within a stream of data symbols 16. Each SYNC burst 14 has a respective predetermined symbol (or, equivalently, bit) sequence on each transmitted polarization. The symbol (bit) sequences of each polarization are preferably transmitted simultaneously, but this is not necessary. In the embodiment of FIG. 2a, two orthogonal bit sequences are used in each SYNC burst 14; each bit sequence being assigned to a respective transmitted polarization. FIG. 2b illustrates an alternative arrangement, in which each of the I and Q components of each transmitted polarization is assigned a respective orthogonal bit sequence. It should be noted that the signal formats illustrated in FIGS. 2a and 2b represent signal formats at the transmitter end of the link. Impairments of the optical link distort the transmitted signal such that the polarizations of the light inbound to the receiver will tend to be neither orthogonal nor aligned with the polarization beam splitter 4.

Returning to FIG. 1, from the A/D converter 12 block, the I and Q sample streams of each received polarization are supplied to a respective dispersion compensator 18, which operates on the sample stream(s) to compensate chromatic dispersion.

Figure 3:
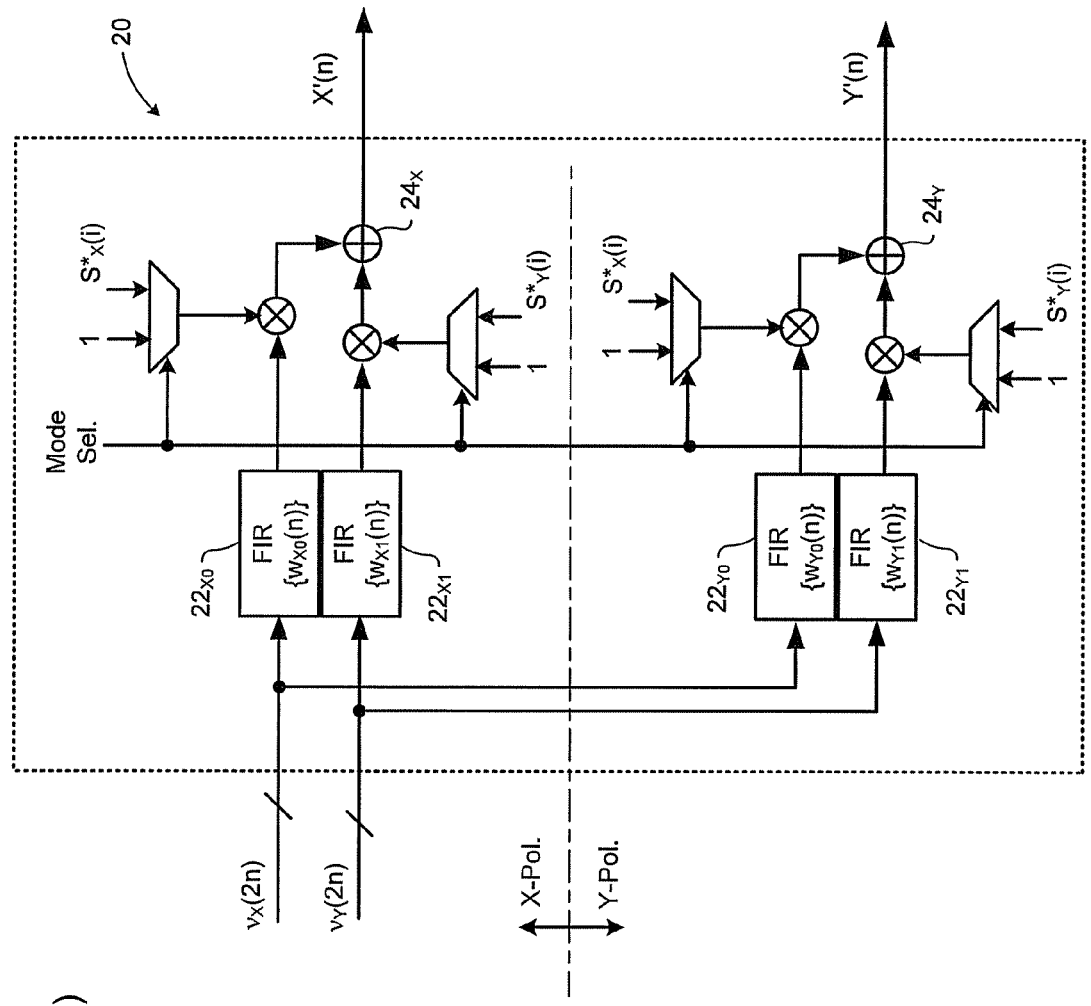
FIG. 3 is a block diagram schematically illustrating principle operations of a polarization compensator known from U.S. Pat. No. 7,606,498.

The dispersion-compensated sample streams appearing at the output of the dispersion compensators 18 are then supplied to a polarization compensator 20 which operates to compensate polarization effects, and thereby de-convolve transmitted symbols from the complex sample streams output from the dispersion compensators 18. If desired, the polarization compensator 20 may operate as described in Applicant's U.S. Pat. No. 7,555,227 which issued Jun. 30, 2009. In the embodiment of FIG. 3, the polarization compensator 20 is provided as a pair of Finite Impulse Response (FIR) filters 22 for each transmitted polarization. Each FIR filter 22 is loaded with respective complex tap weights $\omega_{X0}(n)$, $\omega_{X1}(n)$, $\omega_{Y0}(n)$, and $\omega_{Y1}(n)$ which may be computed as described in U.S. Pat. No. 7,555,227.

In a Training mode of the receiver, the output of each FIR filter 22 is multiplied by the conjugate of the known SYNC symbols $S_X(i)$ and $S_Y(i)$, and summed (at 24) to compute respective correlations between the dispersion compensated samples of the SYNC burst 14 and the known SYNC symbols $S_X(i)$ and $S_Y(i)$. On the other hand, in a data directed mode of the receiver, the FIR outputs are summed (at 24) to generate multi-bit symbol estimates X'(n) and Y'(n) containing both amplitude and phase information of each transmitted symbol. In some embodiments, the symbol estimates X'(n) and Y'(n) are 10-bit digital values, comprising 5-bits for each of the real and imaginary parts. These estimated symbol values include phase error due to the frequency offset Δf between the Tx and LO frequencies, laser line width and Cross-phase modulation (XPM).

Figure 4:
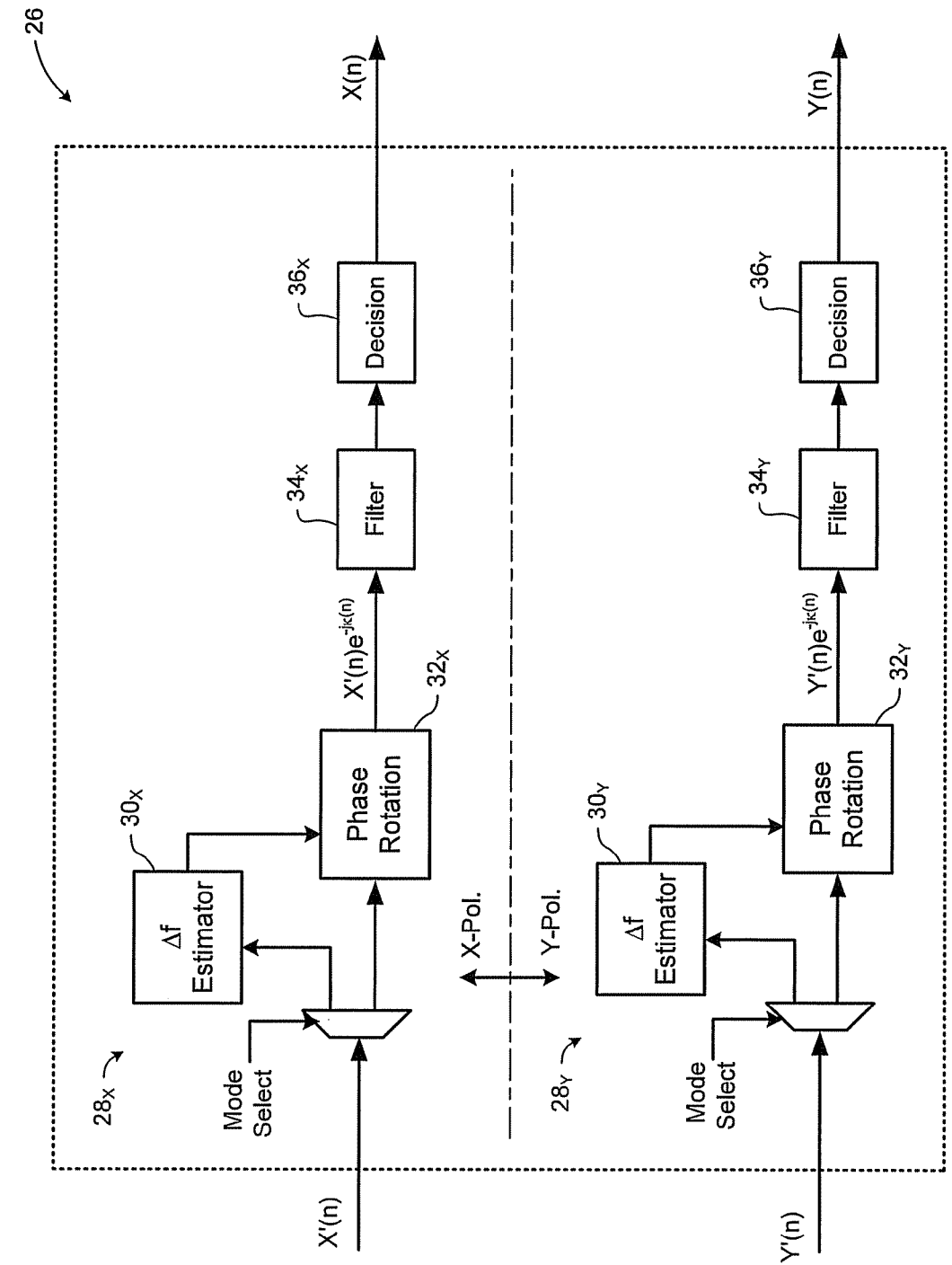
FIG. 4 is a block diagram schematically illustrating principle elements and operations of a carrier recovery block implementing techniques in accordance with a representative embodiment of the present invention.

The polarization compensator 20 outputs are then supplied to a carrier recovery block 26 (see FIG. 1), which performs carrier recovery and phase error correction, and symbol determination. FIG. 4 schematically illustrates a representative carrier recovery block 26 which performs these operations.

In the embodiment of FIG. 4, the carrier recovery block 26 is divided into two substantially identical processing paths 28; one for each transmitted polarization. Each processing path 28 receives a respective output of the polarization compensator 20, and outputs recovered symbols of its respective transmitted polarization. Each processing path 28 includes a frequency error estimator 30, a phase rotator 32, a filter block 34, and a decision circuit 36. In general, each phase rotator 32 uses an estimate of the frequency error generated by the frequency error estimator 30 to compute and apply a phase rotation κ(n) to the symbol estimates received from the polarization compensator 20. The phase-rotated symbol estimates X'(n)$e^{-j\kappa(n)}$ and Y'(n)$e^{-j\kappa(n)}$ generated by the phase rotators 32 are then filtered (at 34) and then processed by the decision circuits 36 to generate the recovered symbol values X(n) and Y(n). Representative embodiments of each of these blocks will be described in greater detail below.

Figure 5:
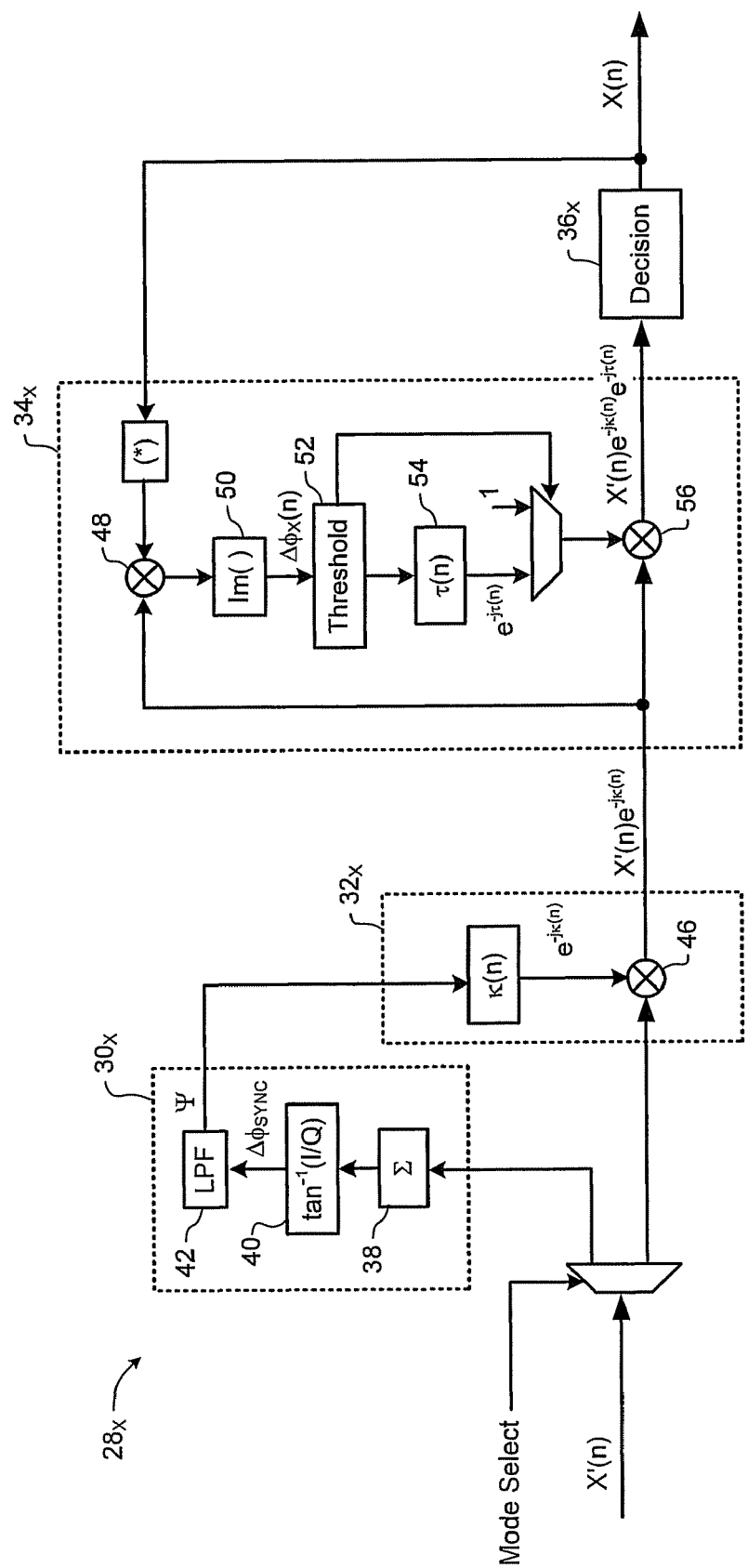
FIG. 5 is a block diagram schematically illustrating the carrier recovery block of FIG. 4 in greater detail.

FIG. 5 schematically illustrates the carrier recovery block 26 of FIG. 4 in greater detail. It will be noted that only the X-Polarization processing path 28$_X$ is illustrated in FIG. 5, it being understood that a substantially identical arrangement will be provided for the Y-Polarization processing path 28$_Y$. The carrier recovery 26 block of FIG. 5 is configured for two operating modes, namely: a "training" mode while processing a SYNC burst 14; and a "data directed" mode while recovering transmitted data symbols 16. In the training mode, the correlation values output by the polarization compensator 20 are supplied to the frequency error estimator 30, which computes a local slope $\psi$ as an estimate of the frequency error due to the frequency offset Δf between the transmit laser and the LO and independent laser line width. In the embodiment of FIG. 5, the SYNC burst correlation values output by the polarization compensator 20 are accumulated (at 38) to average the correlation across at least a portion of the SYNC burst 14. The I and Q components of the averaged correlation value are then used to compute a phase error estimate $$\Delta\phi_{SYNC} = \tan^{-1}\left(\frac{Q}{I}\right)$$

of the SYNC burst at 40. This SYNC burst phase error estimate represents the average phase error of the symbols comprising the SYNC burst, relative to the ideal phase of those symbols, as determined by the encoding format (e.g. PSK, QPSK, 16-QAM etc.) of the optical signal.

As may be appreciated, the symbol estimates of each SYNC burst contain phase errors due to frequency offset Δf, laser line-width, and XPM. Computing an average phase error of each SYNC burst has an effect of low-pass filtering the individual phase errors of the SYNC burst symbols at 42, and so tends to reduce the effects of laser phase noise and XPM. A further reduction in the effects of laser phase noise and XPM can be obtained by low-pass filtering the respective phase error estimates $\Delta\phi_{SYNC}(i)$ of two or more successive SYNC bursts (i=1 ... m) to compute the local slope $\psi$.

Figure 6:
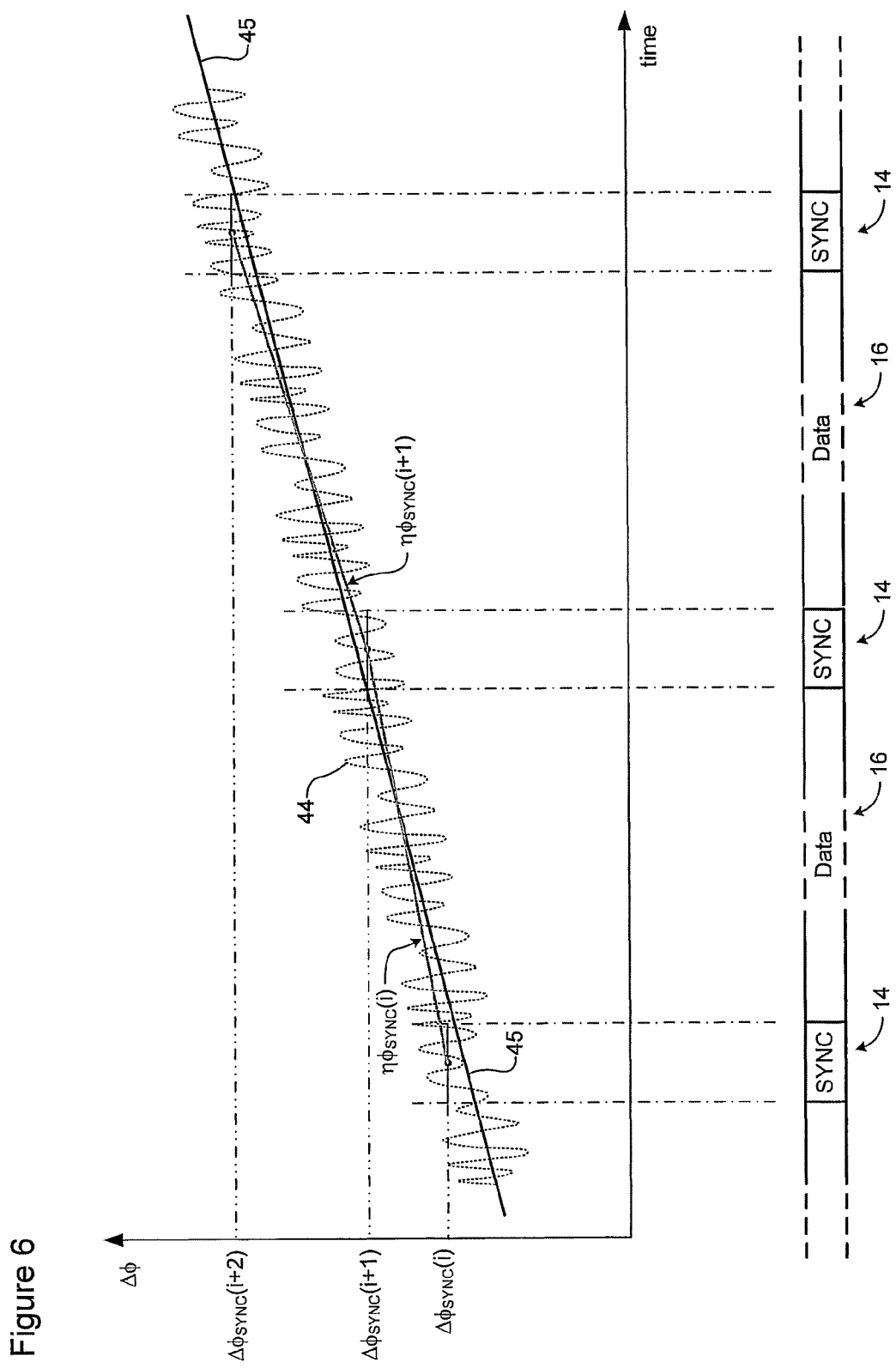
FIG. 6 is a phase error vs. time chart illustrating a representative method of estimating frequency offset in the embodiment of FIG. 5.

For example, FIG. 6 is a chart schematically illustrating phase error Δφ vs. time (shown as dashed line, 44) for a portion of a received signal. The phase error Δφ exhibits an unbounded phase ramp 45 due to the frequency error and short-period phase excursions due to XPM and laser phase noise. The local slope $\psi$ of the phase ramp 45 represents the frequency error due to the frequency offset Δf between the transmit and LO lasers and independent laser line width, while the short-period phase excursions are bounded and average to zero relative to the phase ramp 45. As may be seen in FIG. 6, respective phase error estimates $\Delta\phi_{SYNC}(i)$ of three successive SYNC bursts are shown, each of which represents the average phase error of the symbol estimates comprising the respective SYNC burst. A phase slope $\eta\phi_{SYNC}(i)$ between each pair of successive SYNC bursts (i, i+1) can be computed as:

$$\eta\phi_{SYNC}(i) = \left(\frac{\Delta\phi_{SYNC}(i) - \Delta\phi_{SYNC}(i+1)}{D}\right),$$

where D is the SYNC burst period, which may, for example, be measured in symbols.

In some embodiments, the phase slope $\eta\phi_{SYNC}(i)$ can be directly used as the local slope $\psi$. However, in many cases the phase ramp 45 can be more closely approximated by computing the local slope $\psi$ as an average over a suitable number of successive phase slope values, as may be seen in FIG. 6. The number of phase slope values used to calculate the local slope $\psi$ can be selected based on the expected variability of the frequency error. In cases where the frequency error changes very slowly in comparison to the repetition rate of the SYNC bursts, a relatively large number of phase slope values can be used to calculate the local slope $\psi$. Alternatively, in cases where the frequency error changes more rapidly, a smaller number of phase slope values may be used to calculate the local slope $\psi$. If desired, operations such as finite impulse response filters, infinite impulse response filters, nonlinear filtering functions, extrapolations, interpolations, curve fits, or splines can be applied to obtain the local slope $\psi$.

Once the SYNC symbols 14 have been processed, the receiver switches to the data directed mode, during which the data symbol estimates are rotated by the phase rotators 32 in accordance with the local slope $\psi$, and the resulting rotated symbol estimates X'(n)e$^{-j\kappa(n)}$ and Y'(n)e$^{-j\kappa(n)}$ filtered (at 34) and processed by the decision circuits 36 to generate the recovered symbol values X(n) and Y(n). This operation will be described in greater detail below.

Figure 7A:
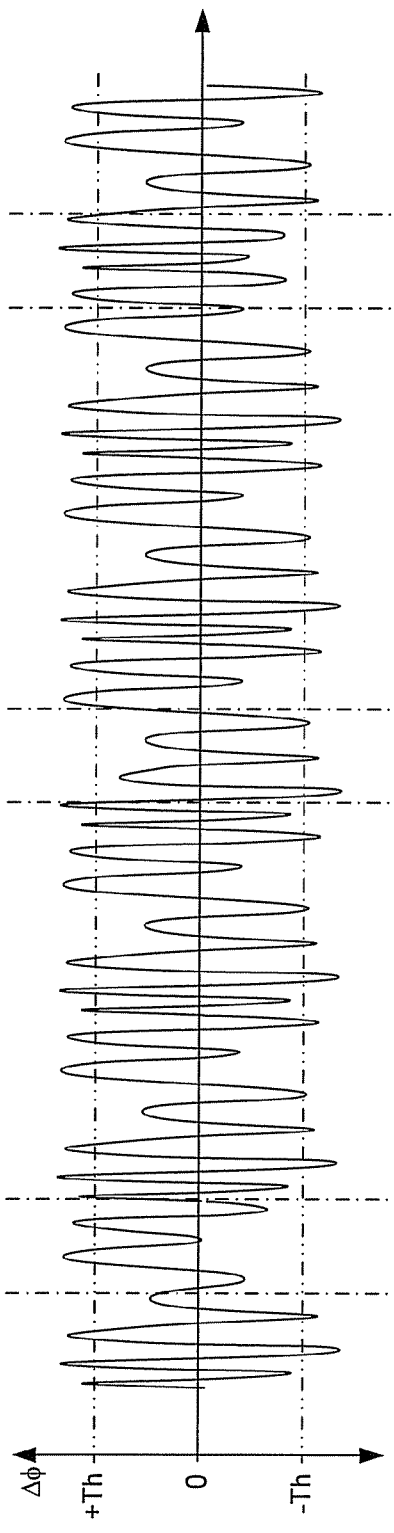
FIGS. 7a and 7b are phase error vs. time charts illustrating a representative method of filtering rotated sample estimates in the embodiment of FIG. 5.

In general, the phase rotator 34 computes and imposes a phase rotation κ(n) which compensates the unbounded phase errors of the corresponding symbol estimates X'(n) and Y'(n). For example, each successive value of the phase rotation κ(n) may be computed using a function of the form:

$$\kappa(n+1) = \kappa(n) + \mu_1 \Psi$$

where the scaling factor $\mu_1$ may be programmable, and defines the phase adjustment step size for each successive data symbol estimate within the data block. If desired, the phase rotation κ(n=N) applied to the last symbol estimate within a data block may be saved and used as an initial phase rotation κ($n_0$) at the start of processing the next data block. However, because the phase error is unbounded, this arrangement can result in the accumulated phase rotation κ(n+1) rising to an effectively infinite value over a period of time. It can therefore be beneficial to reset the value of the initial phase rotation κ($n_0$) for each SYNC burst, prior to processing the next data block. This can be accomplished in a number of different ways. In some embodiments, the initial phase rotation κ($n_0$) for a given data block can be set equal to the phase error estimate $\Delta\phi_{SYNC}(i)$ of the associated SYNC burst. In other embodiments, the initial phase rotation κ($n_0$) for a given data block can be calculated from any of: the phase error estimates $\Delta\phi_{SYNC}(i)$ of two or more SYNC bursts; the phase slope $\eta\phi_{SYNC}(i)$; and the local slope $\psi$ Applying the phase rotation κ(n) to each symbol estimate X'(n) and Y'(n) at 46 yields rotated symbol estimates X'(n)e$^{-j\kappa(n)}$ and Y'(n)e$^{-j\kappa(n)}$ in which the unbounded phase rotation due to the frequency offset Δf between the Tx and LO lasers and independent laser line-width has been removed. The streams of rotated symbol estimates X'(n)e$^{-j\kappa(n)}$ and Y'(n) e$^{-j\kappa(n)}$ will therefore exhibit a zero mean phase error, with short period phase excursions, as may be seen in FIG. 7a. The short period phase excursions represent residual symbol phase error Δφ(n), which is dominated by XPM.

As will be appreciated, a zero symbol phase error corresponds with the ideal phase angle(s) of the symbol values within the phase space of the relevant encoding scheme. The boundaries of each decision region of the encoding scheme phase space therefore correspond with known symbol phase error values above and below zero. For example, the QPSK encoding scheme phase space is divided into four decision regions (quadrants), each of which has a width of ±π/2. The QPSK decision region boundaries lie at ±π/4 relative to the ideal phase angle of each symbol according to the QPSK encoding scheme, which correspond with symbol phase error values of $$\Delta\phi(n) = \pm\frac{\pi}{4}.$$

Figure 7B:
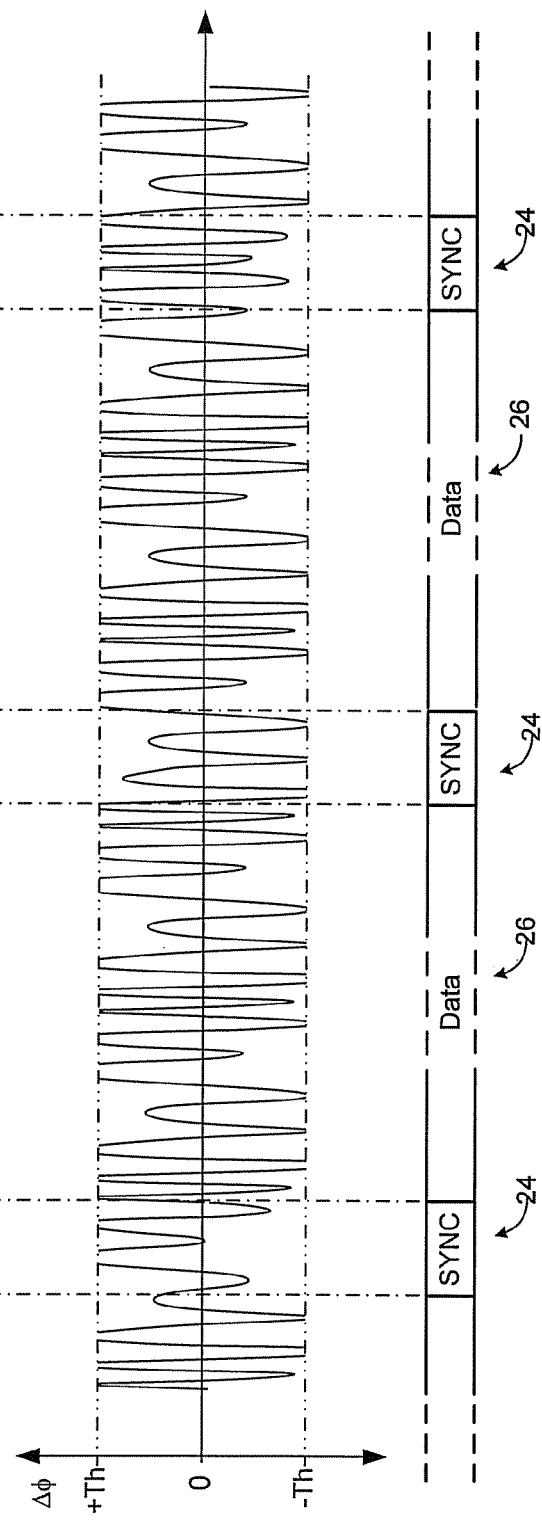

Accordingly, the rotated symbol estimates $X'(n)e^{-j\kappa(n)}$ and $Y'(n)e^{-j\kappa(n)}$ can be filtered by applying a threshold function to the respective symbol phase error values. For example, a pair of threshold values ±Th can be set to correspond with the decision region boundaries (i.e. Th=π/4 for QPSK). Alternatively, the threshold values can be offset from the decision region boundaries, if desired. During run-time, the respective symbol phase error Δφ(n) of each rotated symbol estimate can be compared to the threshold. For values of |Δφ(n)|>|Th|, the rotated symbol estimate may be taken as lying in an adjacent (incorrect) decision region. In such cases, a second or alternative phase rotation τ(n) can be computed and applied to the corresponding rotated phase estimate, such that the resulting rotated symbol estimate $X'(n)e^{-j\kappa(n)}$, $Y'(n)e^{-j\kappa(n)}$ have a symbol phase error |Δφ(n)|≦|Th|. This operation has the effect of clipping the symbol phase error Δφ(n) to the threshold values ±Th, as may be seen in FIG. 7b.

In the embodiment of FIG. 5, this operation is accomplished using a simplified Least Mean Squares (LMS) algorithm. Thus, the filter 34 implements a carrier phase detector in which the rotated symbol estimate $X'(n)e^{-j\kappa(n)}$ and the conjugate of the corresponding recovered symbol value X(n) are multiplied (at 48) to obtain a multi-bit correlation value. The imaginary part of this multi-bit correlation value is determined at 50, and represents the approximate phase error $\Delta\phi_X(n)=\text{Im}\{X'(n)e^{-j\kappa(n)}\cdot X^*(n)\}$ between the phase of the rotated symbol estimate $X'(n)e^{-j\kappa(n)}$ and that of the corresponding recovered symbol X(n). The computed symbol phase error $\Delta\phi_X(n)$ is then compared to the threshold at 52, and the comparison result used to calculate the second phase rotation τ(n) at 54 and apply the calculated phase rotation to the rotated symbol estimate $X'(n)e^{-j\kappa(n)}$ at 56.

Following the clipping operation described above, the rotated symbol estimates may be taken as lying in the correct decision region of the encoding scheme phase space, and the residual phase errors (due to XPM) yield excursions of the symbol phase within that decision region. Accordingly, the decision block 36 may operate to determine the recovered symbol values X(n) and Y(n) using methods known, for example, from U.S. Pat. No. 7,606,498. However, because the local slope ψ is derived from the SYNC bursts, which are impervious to cycle slips, the probability of errors in the recovered symbol values X(n) and Y(n) due to cycle slips is very low as compared to prior art methods.

Figure 8:
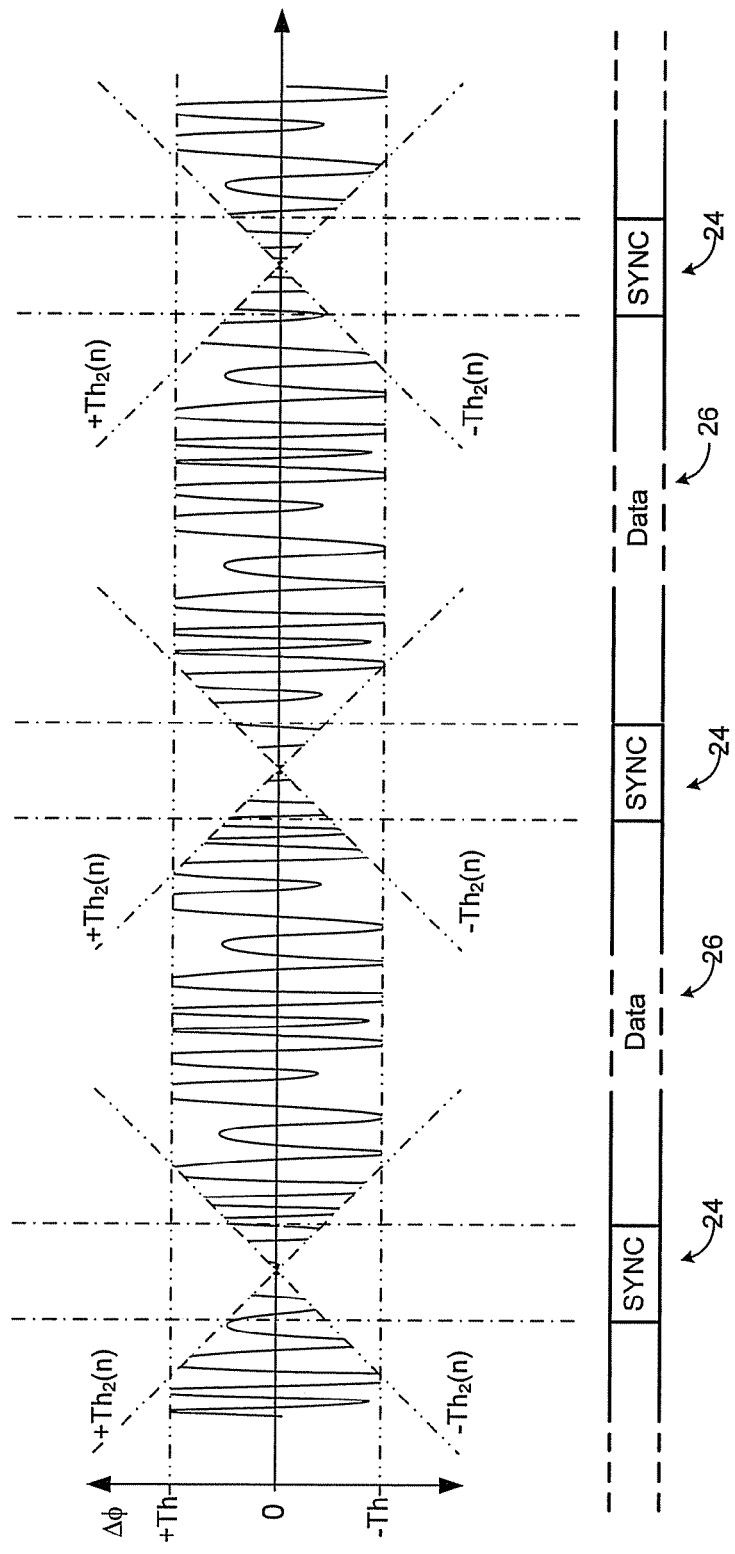
FIG. 8 is a phase error vs. time chart illustrating a second representative method of filtering rotated sample estimates in the embodiment of FIG. 5.

As may be appreciated, the bandwidth of the filter block 34 (which implements a carrier phase detector) is preferably selected to track excursions of the symbol phase due to XPM. In practice, this means that, for symbols lying close to the SYNC bursts, the maximum symbol phase error Δφ(n+1) that can be processed without producing a cycle slip may be limited by the bandwidth of the carrier phase detector, rather than the width of the decision region of the encoding scheme phase space. This is not a problem, in that it just effectively introduces a second limit function Th$_2$(n) having a slope corresponding to the slew rate of the carrier phase detector. Where advantageous, additional or other clipping or nonlinear functions could be introduced, an example of which may be seen in FIG. 8.

In practice, the clipping operations described above with reference to FIGS. 7-8 successfully prevent cycle slips, but increases the probability that the symbol estimates subjected to the clipping operation will themselves be erroneously detected. For low to moderate levels of XPM, the number of errored symbols due to clipping will represent only a small proportion of the symbols within any given data block. In such cases, known Forward Error Correction (FEC) techniques may be used to correct the errored symbols, even with a FEC budget that is significantly lower than that required in the prior art to correct errored symbols due to cycle slips.

As XPM increases, the number of rotated symbol estimates $X'(n)e^{-j\kappa(n)}$ and $Y'(n)e^{-j\kappa(n)}$ having a large residual phase error also increases, as does the probability that the corresponding recovered data symbols X(n) and Y(n) will be erroneous due to the clipping operation. Accordingly, for high levels of XPM, an alternative method of filtering the rotated symbol estimates $X'(n)e^{-j\kappa(n)}$ and $Y'(n)e^{-j\kappa(n)}$, would be desirable.

Figure 9:
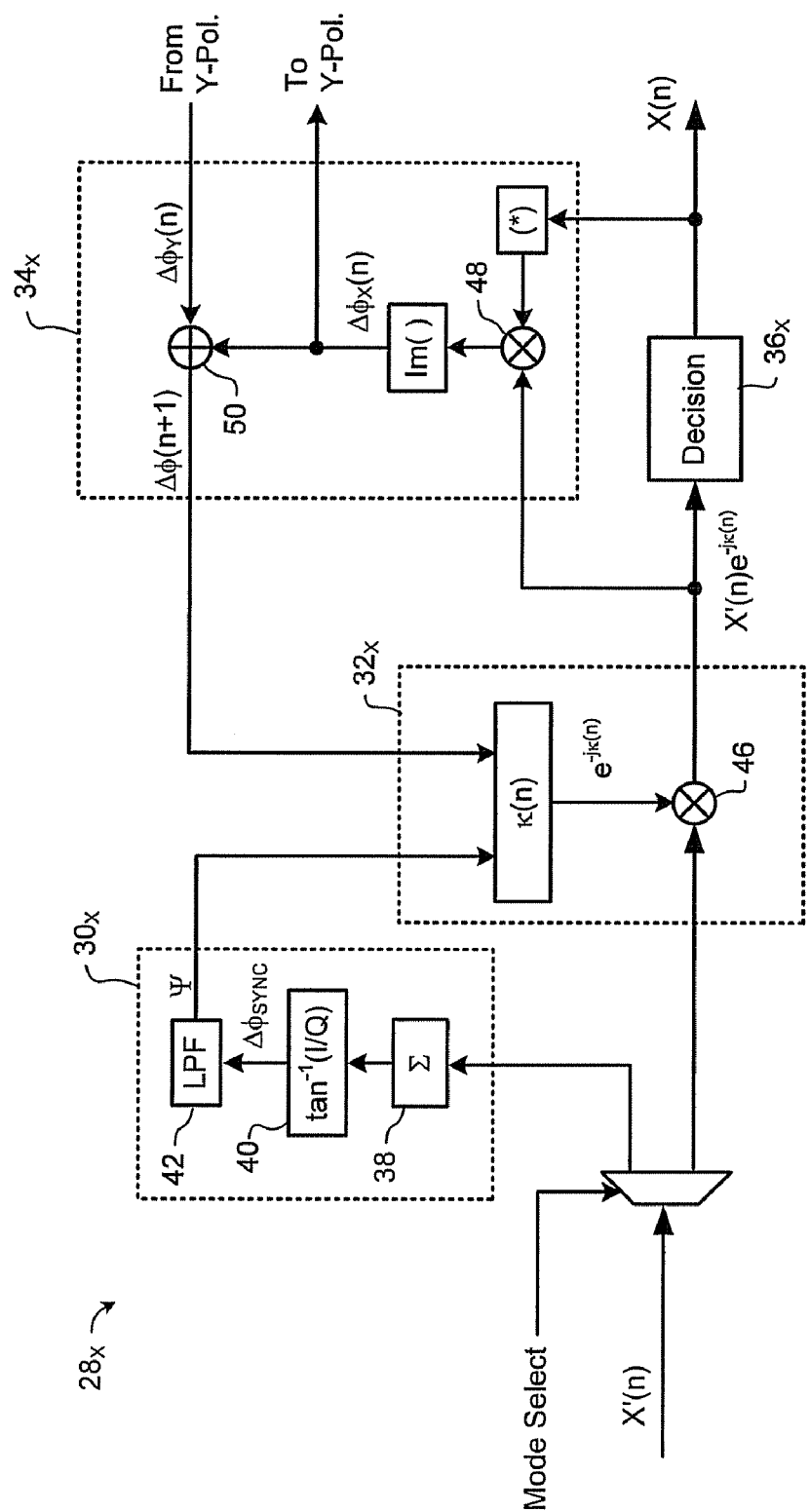
FIG. 9 is a block diagram schematically illustrating principle elements and operations of a carrier recovery block implementing techniques in accordance with a second representative embodiment of the present invention.

As a process that is not white, XPM phase noise can be tracked. The XPM contribution to the phase noise at a given symbol is not independent from that at neighbouring symbols, and thus knowledge of past values can be used to predict a future value and subtract it out. The results is a noise process with reduced variance, which can therefore be more easily filtered. FIG. 9 is a block diagram schematically illustrating a carrier recovery block 26 which is capable of tracking and compensating large scale phase rotations due to XPM.

In the embodiment of FIG. 9, the phase rotation κ(n) computed by the phase rotator 32 includes first and second order phase rotation teens. Thus:

$$\kappa(n+1)=\kappa(n)+\mu_1\Psi+\mu_2\Delta\phi(n+1)$$

where the scaling factors $\mu_1$ and $\mu_2$ may be programmable, and define the phase adjustment step sizes for each successive data symbol estimate within the data block. The first order phase rotation $\mu_1\Psi$ is computed as described above with reference to FIGS. 5 and 6, and compensates the unbounded phase rotation due to the frequency offset Δf between the transmit and LO lasers and independent laser line-width. The second order phase rotation term $\mu_2\Delta\phi(n+1)$ is updated at the symbol rate, and tracks the phase rotations due to laser linewidth and XPM. A frequency domain view to this is that the XPM phase noise and the bounded laser linewidth noise are a low pass process, and the second order phase rotation term $\mu_2\Delta\phi(n+1)$ represents a high pass filter with a bandwidth determined by μ2. Integrating the result over the frequency range of the optical signal yields the variance of the residual XPM and laser noise. This is only mathematically valid because the unbounded phase error contributions are compensated by the first order phase rotation term $\mu_2\Psi$.

In the embodiment of FIG. 9, the symbol phase error Δφ(n+1) is computed using a simplified Least Mean Squares (LMS) algorithm or IIR filter. Thus, the filter block 34 implements a carrier phase detector in which the rotated symbol estimate $X'(n)e^{-j\kappa(n)}$ and the conjugate of the corresponding recovered symbol value X(n) are multiplied (at 48) to obtain a multi-bit correlation value. The imaginary part of this multi-bit correlation value represents the phase error $\Delta\phi_X(n)=\text{Im}\{X'(n)e^{-j\kappa(n)}\cdot X^*(n)\}$ between the estimated and actual symbol phase. Adding the corresponding phase error $\Delta\phi_Y(n)=\text{Im}\{Y'(n)e^{-j\kappa(n)}\cdot Y^*(n)\}$ computed for the Y-polarization (at 50) yields a symbol phase error Δφ(n+1) with an improved signal-to-noise ratio.

Taken together, the first and second order terms $\mu_1\Psi$ and $\mu_2\Delta\phi(n+1)$ provide an estimate of the incremental phase change $\Delta\kappa$ between the $n^{th}$ and $(n+1)^{th}$ symbols. Accumulating this incremental value $\Delta\kappa$ for each successive data symbol yields the updated phase rotation $\kappa(n+1)$.

An advantage of the embodiment of FIG. 9, is that the first and second order terms $\mu_1\Psi$ and $\mu_2\Delta\phi(n+1)$ are independently calculated using respective adaptation loops. This enables the response time and bandwidth of each adaptation loop to be optimized for the specific types of phase errors being compensated. More particularly, the bandwidth of the carrier detector (filter 34) can be optimized to facilitate compensation of XPM, while the response of the frequency offset estimator 30 can be optimized to track changes in the frequency offset $\Delta f$. Additionally, in the embodiment of FIG. 9, the phase rotation $\kappa(n)$ is updated for each symbol to compensate both frequency offset and XPM. This means that the residual phase error of each rotated symbol estimate reflects changes in the XPM during the inter-symbol period, rather that the XPM itself. As a result, the embodiment of FIG. 9 can tolerate significantly larger levels of XPM then the embodiments of FIGS. 5-8.

As noted above, the first-order phase rotation term $\mu_1\Psi$ compensates phase errors due to the frequency offset $\Delta f$ between the carrier and the LO, while the second order phase rotation term $\mu_1\Delta\phi(n+1)$ compensates phase errors due to laser line-width and XPM. For relatively low levels of XPM, the first-order phase rotation term $\mu_1\Psi$ will rotate the symbol phase to lie within the correct decision region of the encoding scheme phase space, and residual phase errors (due to laser line-width and XPM) will yield excursions of the symbol phase within that decision region. In such a case, the decision block 36 may operate to determine the recovered symbol values $X(n)$ and $Y(n)$ in a manner as described in U.S. Pat. No. 7,606,498. However, because the local slope $\psi$ is derived from the SYNC bursts, which are impervious to cycle slips, the probability of errors in the recovered symbol values $X(n)$ and $Y(n)$ due to cycle slips is very low as compared to prior art methods.

In the embodiments described above, the phase evolution due to the frequency error between the transmit and LO lasers is modeled using a piece wise linear approximation, in which each segment has a respective constant local slope $\psi$. The local slope $\psi$ is updated each SYNC burst, during "training mode" operation of the receiver. This arrangement is convenient, in that it provides a means of modelling the phase evolution by processing the SYNC bursts, which provides satisfactory performance with simple circuitry. However, if desired, the SYNC bursts can be processed using higher order operations such as curve fitting or splines, for example. In such cases, the resulting model (curve of best fit, or cubic spline) can be used to update local slope $\psi$ every M symbols, where $M \geq 1$. For the reduced case of M=1, the local slope $\psi$ is updated every symbol, which enables tracking and compensation of constantly changing frequency error.

Although the invention has been described with reference to certain specific embodiments, various modifications thereof will be apparent to those skilled in the art without departing from the spirit and scope of the invention as outlined in the claims appended hereto.

We claim:

1. In a coherent receiver of an optical communications system, a method of data symbol recovery comprising:
    a frequency error estimator computing an estimate of a frequency offset $\Delta f$ between a transmit laser and a Local Oscillator (LO) of the receiver;
    a phase rotator applying a phase rotation $\kappa(n)$ to a plurality of data symbol estimates to generate corresponding rotated symbol estimates, the phase rotation $\kappa(n)$ being derived from the estimated frequency offset $\Delta f$; and
    a filter block processing the rotated symbol estimates using a bounded filter function to generate corresponding decision values of each data symbol.

2. The method of claim 1, wherein each data symbol is encoded in accordance with a predetermined encoding scheme, and wherein the predetermined encoding scheme is not a differential encoding scheme.

3. The method of claim 1, further comprising:
    processing two or more SYNC bursts having a known symbol sequence and periodicity to derive an estimate of the frequency offset $\Delta f$ between a transmit laser and a Local Oscillator (LO) of the receiver.

4. The method of claim 3, wherein processing two or more SYNC bursts comprises:
    calculating a phase slope $\eta\phi_{SYNC}(i)$ between a pair of successive SYNC bursts; and
    deriving a phase offset parameter $\psi$ based on the calculated phase slope.

5. The method of claim 4, wherein calculating the phase slope between a pair of successive SYNC bursts comprises:
    calculating a respective phase error $\Delta\phi_{SYNC}(i)$ of each SYNC burst, relative an ideal phase of corresponding symbol values within a phase space of an encoding scheme used to encode the data symbols;
    calculating the phase slope $\eta\phi_{SYNC}(i)$ using the respective phase errors and the known periodicity of the SYNC bursts.

6. The method of claim 4, wherein the phase offset parameter $\psi$ is equal to the calculated phase slope.

7. The method of claim 4, wherein the phase offset parameter $\psi$ is equal to an average of respective phase slopes of two or more successive pairs of SYNC bursts.

8. The method of claim 4, wherein computing the phase rotation $\kappa(n)$ comprises accumulating, for each successive data symbol estimate, a corresponding incremental phase rotation corresponding to $\mu_1\psi$, where $\mu_1$ is a scaling factor defining a phase adjustment step size for each successive symbol estimate.

9. The method of claim 1, wherein processing the rotated symbol estimates comprises, for each rotated symbol estimate:
    calculating a respective symbol phase error $\Delta\phi(n)$ of the rotated symbol estimate;
    filtering the rotated symbol estimate based on the calculated symbol phase error $\Delta\phi(n)$; and
    selecting a decision value of a corresponding data symbol based on the filtered symbol estimate.

10. The method of claim 9, wherein filtering the rotated symbol estimate comprises:
    comparing the respective symbol phase error $\Delta\phi(n)$ to a predetermined threshold; and
    when the respective symbol phase error $\Delta\phi(n)$ exceeds the predetermined threshold, clipping a phase of the rotated symbol estimate.

11. The method of claim 10, wherein clipping a phase of the rotated symbol estimate comprises:
    calculating a second phase rotation $\tau(n)$ based on a difference between the respective symbol phase error $\Delta\phi(n)$ and the predetermined threshold; and
    applying the second phase rotation $\tau(n)$ to the rotated symbol estimate.

12. The method of claim 9, wherein the predetermined threshold value is based on a width of decision regions of a phase space of an encoding scheme used to encode the data symbols.

13. The method of claim 12, wherein the predetermined threshold value corresponds with a phase offset of boundaries of each decision region, relative an ideal phase of symbols of the encoding scheme.

14. The method of claim 12, wherein the predetermined threshold value differs from a phase offset of boundaries of each decision region, relative an ideal phase of symbols of the encoding scheme.

15. The method of claim 9, wherein the predetermined threshold value is based on a bandwidth of a filter block of the receiver for filtering the rotated symbol estimates.

16. The method of claim 9, wherein filtering the rotated symbol estimate comprises, for each symbol estimate:
computing a respective second order phase rotation term $\mu_2 \Delta\phi(n+1)$ based on the symbol phase error $\Delta\phi(n)$, where $\mu_2$ is a scaling factor defining a phase adjustment step size for each successive symbol estimate; and
adding the second order phase rotation term $\mu_2 \Delta\phi(n+1)$ to the phase rotation $\kappa(n)$ applied to the symbol estimate.

17. The method of claim 9, wherein selecting the decision value comprises:
analysing a phase of the filtered symbol estimate to identify a decision region, of a phase space of an encoding scheme used to encode the data symbols, in which the filtered symbol estimate is located; and
selecting a symbol value of the encoding scheme associated with the identified decision region as the decision value.

18. A coherent receiver of an optical communications system, the coherent receiver comprising:
a frequency error estimator for computing a frequency offset $\Delta f$ between a transmit laser and a Local Oscillator (LO) of the receiver;
a phase rotator for applying a phase rotation $\kappa(n)$ to a plurality of data symbol estimates to generate corresponding rotated symbol estimates, the phase rotation $\kappa(n)$ being derived from the estimated frequency offset $\Delta f$; and
a filter block for processing the rotated symbol estimates using a bounded filter function to generate corresponding decision values of each data symbol.

* * * * *